(12) United States Patent
Malik et al.

(10) Patent No.: US 6,977,654 B2
(45) Date of Patent: Dec. 20, 2005

(54) DATA VISUALIZATION WITH ANIMATED SPEEDOMETER DIAL CHARTS

(75) Inventors: Shadan Malik, Pittsburgh, PA (US); Quaid Saifee, Rochester Hills, MI (US)

(73) Assignee: IVIZ, Inc., Troy, MI (US)

( * ) Notice: Subject to any disclaimer, the term of this patent is extended or adjusted under 35 U.S.C. 154(b) by 463 days.

(21) Appl. No.: 10/283,288

(22) Filed: Oct. 30, 2002

(65) Prior Publication Data
US 2004/0085317 A1   May 6, 2004

(51) Int. Cl.$^7$ ............................................ G06T 11/20
(52) U.S. Cl. ............................................... 345/440
(58) Field of Search ............................... 345/440, 443; 116/57, 62.1; 353/14, 73

(56) References Cited

OTHER PUBLICATIONS

Merriam Webster, Merriam Webster's Collegiate Dictionary, Tenth Edition © 1997, pp. 310 and 591.*
Microsoft, Microsoft Flight Simulator 2000 Pilot's Handbook, pp. 16, 152 and backcover.*

* cited by examiner

*Primary Examiner*—Matthew C. Bella
*Assistant Examiner*—G. F. Cunningham
(74) *Attorney, Agent, or Firm*—Kenyon & Kenyon

(57) ABSTRACT

A system and method of facilitating data visualization provides for plotting a plurality of independent variable values along an axis of a web-based chart. The plurality of independent variable values corresponds to a plurality of data points. Notification of a user selection of an area of the chart is received and a dependent variable of a particular data point is animated as a speedometer reading if the selected area corresponds to an independent variable value of the particular data point.

29 Claims, 5 Drawing Sheets

DATA VISUALIZATION WITH ANIMATED SPEEDOMETER DIAL CHARTS

BACKGROUND

1. Technical Field

Embodiments of the present invention generally relate to facilitating data visualization. More particularly, the embodiments relate to the use of speedometer dial animation to view data points in a chart.

2. Discussion

Graphics are an extremely effective way to communicate information, and a variety of graphical charts are often used to visualize data. Some of the more popular graphic chart types are pie charts, vertical bar charts, horizontal bar charts, data plot charts, line trend charts, bubble charts, and so on. Each of these chart types displays data in a different manner in an effort to improve data visualization and user recognition of data relationships. Such graphical charts have been adopted by a wide variety of software systems that deal with data visualization.

While some data visualization techniques have been acceptable under certain circumstances, a number of difficulties remain. For example, many of the above approaches are limited in their ability to help the user perceive differences between data when the amount of data is relatively large. Specifically, there is a threshold beyond which a user is unable to distinguish between bars in a horizontal bar chart or lines in a line chart. The same is true for many other types of charts. There is therefore a need to facilitate data visualization in a manner that improves user perception when many data points are presented.

BRIEF DESCRIPTION OF THE DRAWINGS

The various advantages of embodiments of the present invention will become apparent to one skilled in the art by reading the following specification and appended claims, and by referencing the following drawings, in which:

DETAILED DESCRIPTION

Figures 1, 2:
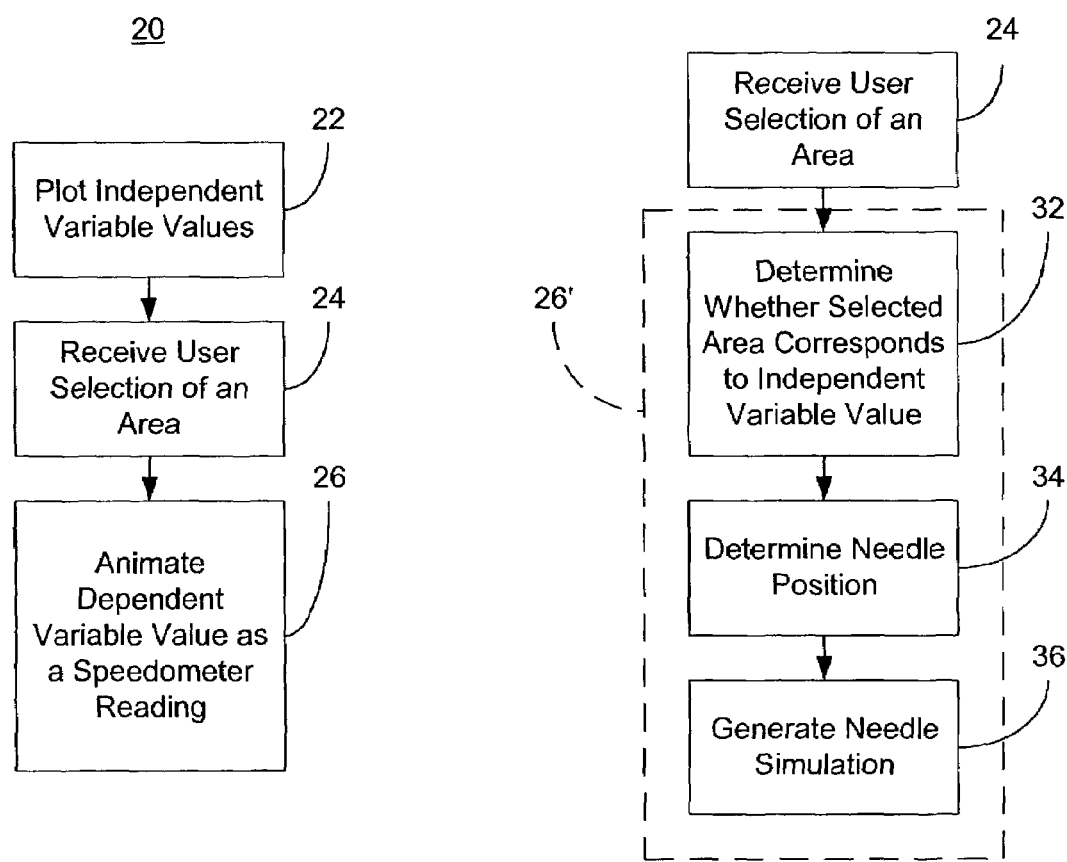
FIG. 1 is a flowchart of an example of a method of facilitating data visualization according to one embodiment of the invention.
FIG. 2 is a flowchart of an example of a process of animating a dependent variable value as a speedometer reading according to one embodiment of the invention.
Figure 6:
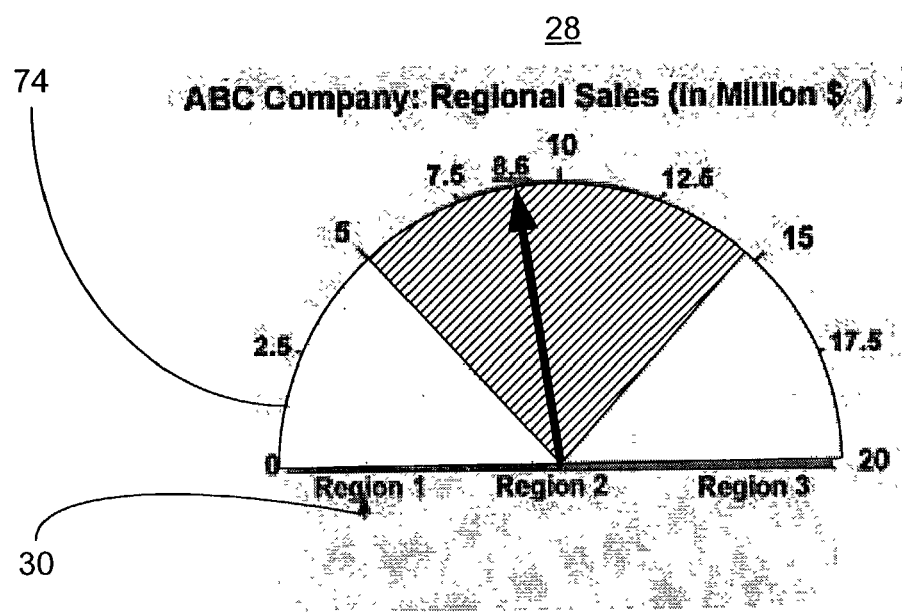
FIG. 6 is a screen print of an example of a chart having an animated speedometer reading of a dependent variable value according to one embodiment of the invention.

FIG. 1 shows a method 20 of facilitating data visualization. Processing block 22 provides for plotting a plurality of independent variable values along an independent variable axis of a chart, where the plurality of independent variable values correspond to a plurality of data points. Notification of a user selection of an area of the chart is received at block 24. The selection typically corresponds to the user positioning a cursor over or near the area in question, where a browser plug-in reports the cursor position back to a flash engine. The plug-in and flash engine are described in greater detail below. Block 26 provides for animating a dependent variable value of a particular data point as a speedometer reading in the chart if the selected area corresponds to an independent variable value of the particular data point. An illustration of this technique can be seen in chart 28 of FIG. 6, wherein the user selects the independent variable value Region 1 by pointing cursor 30 to the area illustrated as "Region 1", and the system responds by animating a speedometer reading of 8.6. It should be noted that while three independent variable values are illustrated in chart 28, any number of values may be plotted depending upon the space constraints of the display.

FIG. 2 demonstrates one approach to animating the dependent variable value as a speedometer reading in greater detail at block 26'. Specifically, processing block 32 provides for determining whether the selected area corresponds to the independent variable value of a data point. A needle position of the speedometer reading is determined at block 34 based on a relationship between the dependent variable value of the data point and an angular spread of the chart. The angular spread can take on any value up to 360 degrees, and can be modified based on user input. Block 36 provides for generating the needle simulation based on the determined needle position.

Figure 3:
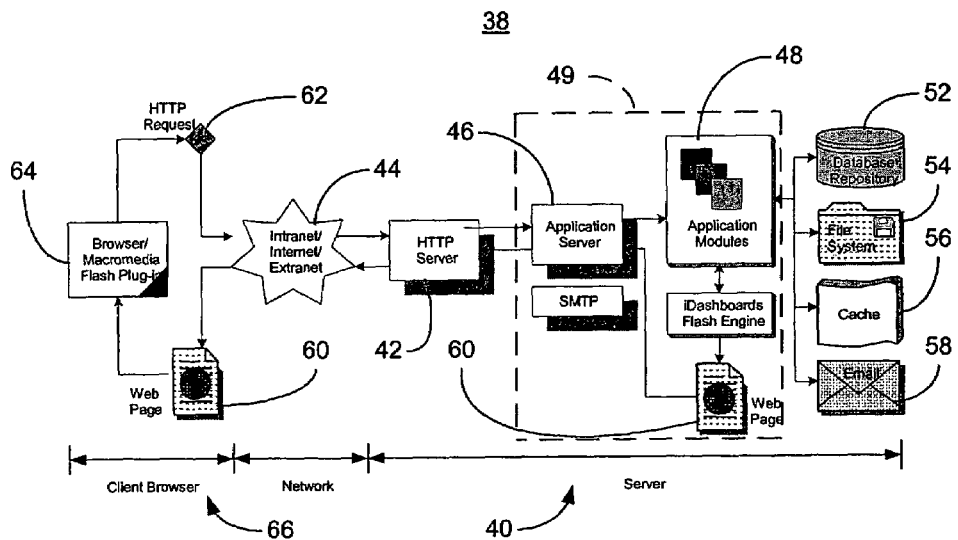
FIG. 3 is a diagram of an example of a networking architecture according to one embodiment of the invention.

Turning now to FIG. 3, a networking architecture 38 that implements the simulated speedometer is shown. Generally, the architecture 38 is partitioned into a client browser 66, a network 44 and a server (or system) 40. System 40 includes a hypertext transfer protocol (HTTP) server 42, which interfaces with network 44, and an application server 46, which interfaces with any number of application modules 48 and the HTTP server 42. A processor 49 executes a flash engine 50 and is operatively coupled to a number of supporting components through the application modules 48. The supporting components include a database depository 52, a machine readable storage medium such as file system 54, cache memory 56 and e-mail module 58. The flash engine 50 generates web pages 60 in order to satisfy HTTP requests 62, which are generated by a flash plug-in 64 running on client browser 66. The web pages 60 can include the various charts and interfaces described herein, and comply with the well documented HTTP standard (Internet Engineering Task Force—IETF). Thus, architecture 38 provides a unique web-based approach to data visualization.

Figure 4:
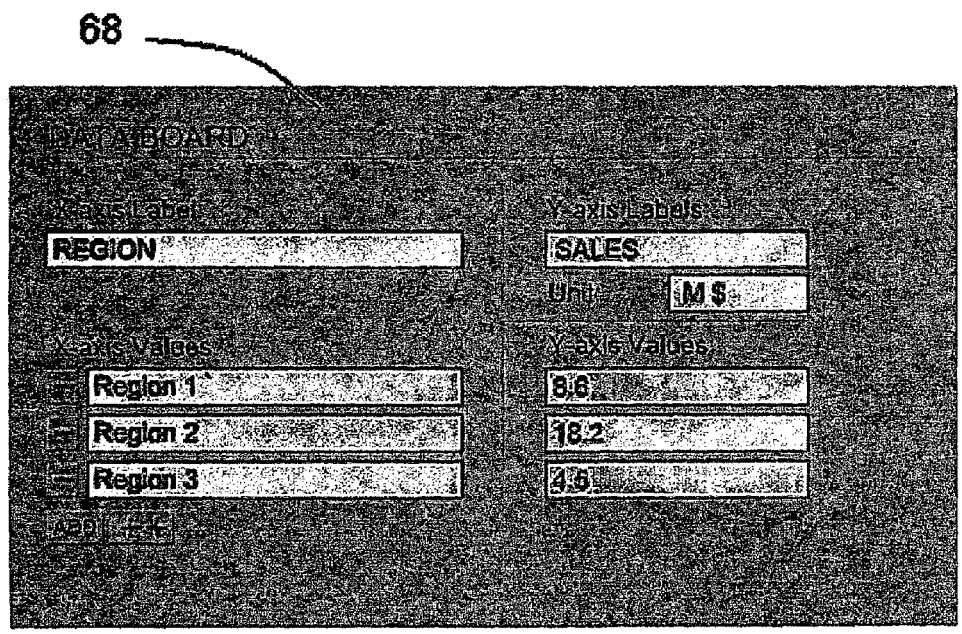
FIG. 4 is a screen print of an example of a data entry interface according to one embodiment of the invention.

Turning now to FIG. 4, it can be seen that the plurality of data points may be received over the network connection via a data entry interface 68. The data points may also be obtained by using any commercially available data migration tool to access one or more databases stored in the database repository 52 (FIG. 3) or elsewhere on the network.

A data point includes an independent variable value and at least one dependent variable value. Each variable is given a label, which defines the type of data to be displayed. In the illustrated example, the independent variable is given the label "Region" and values of "Region 1", "Region 2" and "Region 3". The dependent variable values are 8.6, 18.2 and 4.5, for regions 1, 2 and 3, respectively, where the dependent variable is given the label of "Annual Sales". It should be noted that the illustrated "ADD" and "++" buttons enable the user to increase the number of rows in increments of one or multiple rows, respectively. Similarly, the "−" buttons adjacent to each row enable the user to decrease the number of rows based on the size of the corresponding data set.

Figure 5:
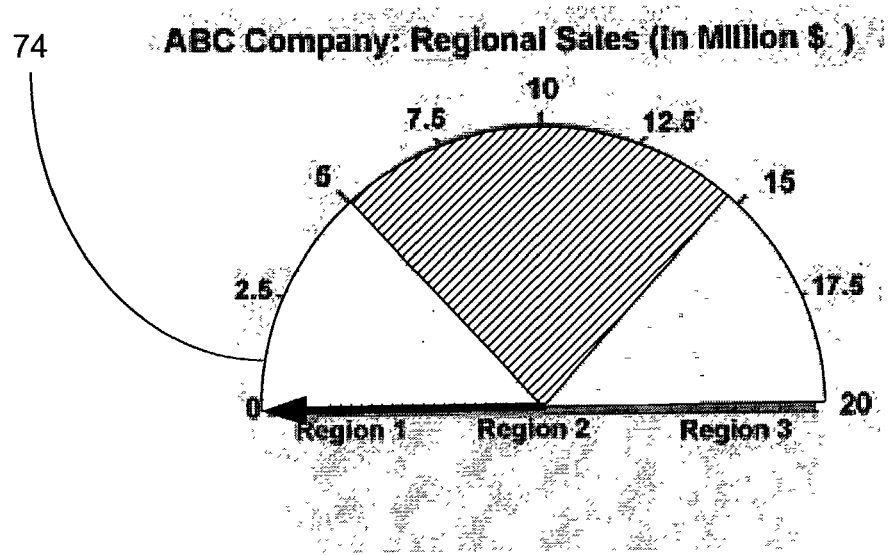
FIG. 5 is a screen print of an example of a chart having an animated speedometer reading of zero according to one embodiment of the invention.
Figure 7:
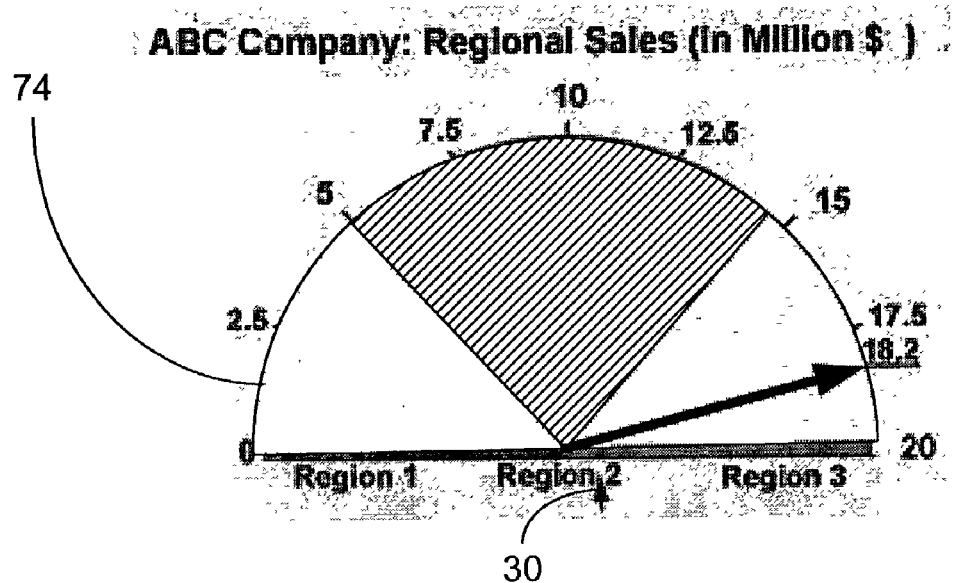
FIG. 7 is a screen print of an example of a chart having an animated speedometer reading of a second dependent variable value according to one embodiment of the invention.
Figure 8:
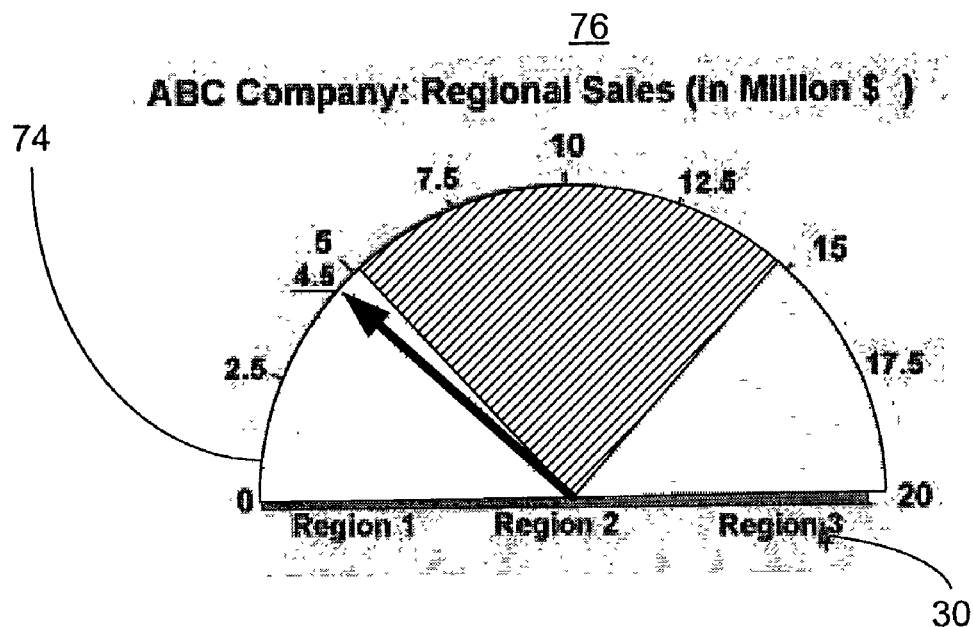
FIG. 8 is a screen print of an example of a chart having an animated speedometer reading of a third dependent variable value according to one embodiment of the invention.

FIG. 5 demonstrates that a speedometer reading of zero can be animated if the selected area does not correspond to any of the plurality of independent variable values plotted along the independent variable axis of chart 70. Turning now to FIG. 7, chart 72 illustrates that when it is determined that the user has moved the cursor 30 to a different data point, the needle's position reflects the dependent variable value associated with the new data point on the independent variable axis. It can further be seen that the actual dependent variable value, 18.2, is highlighted while the previous value is no longer displayed. In addition, a multi-colored chart background 74 is generated to reflect a plurality of dependent variable ranges. Thus, the user can readily determine that the speedometer reading of chart 72 is in the right-most range, whereas the speedometer reading of chart 28 (FIG. 6) is in the middle range. FIG. 8 illustrates yet another data point speedometer reading in chart 76. It should be noted that a second dependent variable value of each independent variable value can be simultaneously animated as a second speedometer reading in the chart by adding needles to the chart. In such a case the appearance of each needle (e.g., length, color, line width, etc.) is different in order to distinguish between dependent variable values.

Figure 9:
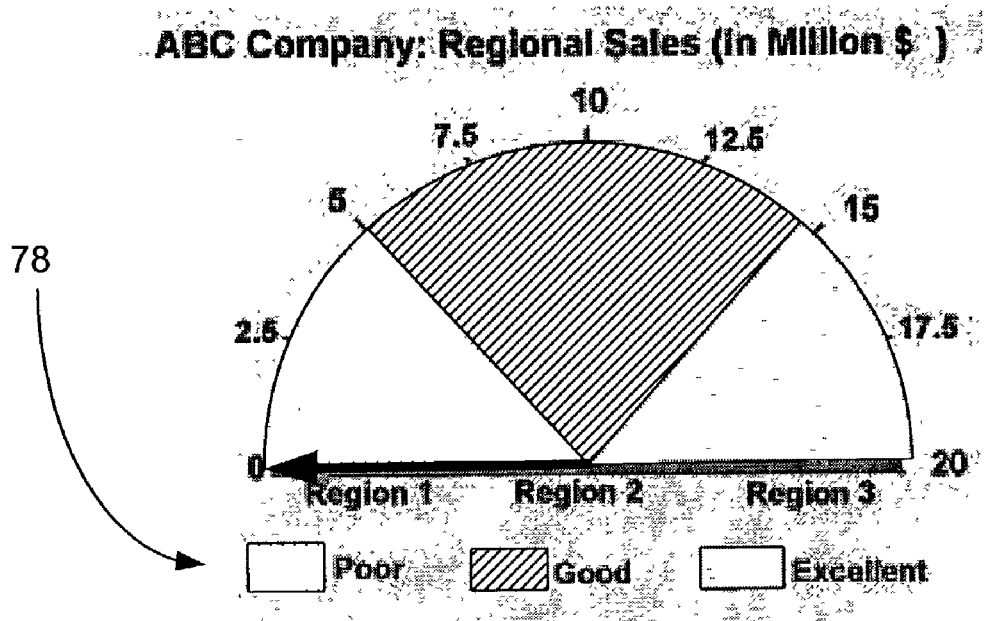
FIG. 9 is a screen print of an example of a chart having a background legend according to one embodiment of the invention.
Figure 10:
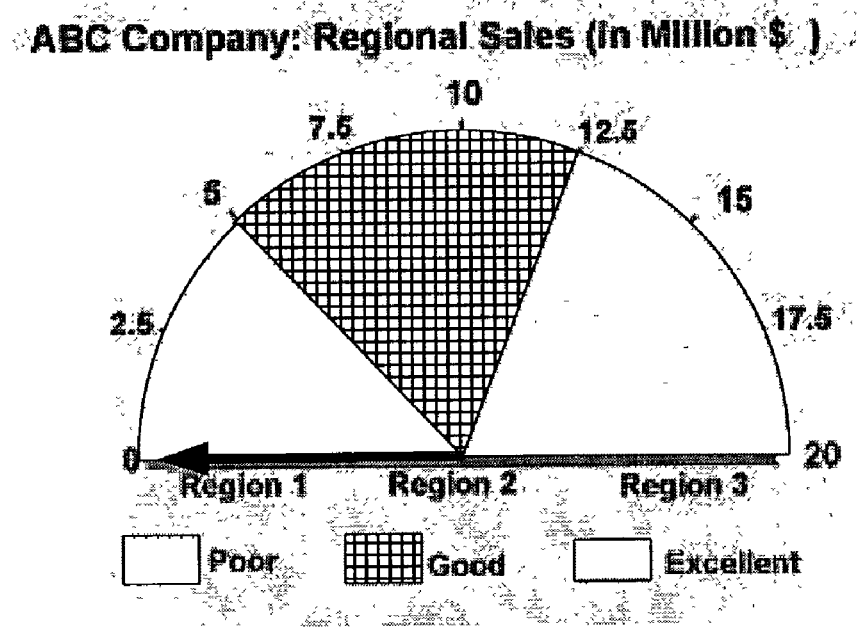
FIG. 10 is a screen print of an example of a chart having a multi-colored background that has been modified based on user input according to one embodiment of the invention.

FIG. 9 demonstrates that a background legend 78 can be generated in chart 80 to assist the user in interpreting the chart 80. This approach is particularly useful in cases wherein there are many ranges. Each color-coded range on the chart 80 can be treated like a separate decision sector that may call for different actions or decisions. Such an approach increases the richness of information portrayal and delivers a clearer message to the user. In FIG. 10, chart 82 demonstrates that both the ranges and the color parameters of the background can be defined based on user input, to further improve flexibility. It should be noted that all of the ranges, settings and/or user input can be stored to a database in the database repository 52 (FIG. 3) for later retrieval.

Thus, embodiments of the present invention provide a visual display technique and software system for more intuitively presenting data through animated speedometer dial type charts. Such a visual representation is more meaningful to the user in many cases of data analysis. This approach allows a graphical chart to be displayed in an Internet browser (such as Microsoft® Internet Explorer® or Netscape®), and therefore to be transmitted through the Internet or an intranet.

The system can provide the user with the option of inputting data through an intuitive data entry interface. Such data entry allows user to provide labels as well as values of the two variables (commonly denoted as X and Y) that need to be displayed in the Chart. The data entry interface also enables the user to provide options for various data ranges that need to be highlighted differently within the drawn chart. Also, the system may assume default values for such ranges if the user doesn't provide specific values.

After the data is provided for the variables being plotted on the chart, embodiments of the speedometer dial chart display can determine the relationship between the angular spread of the arched display and numerical values for the dependent variable (commonly denoted as the Y variable). The full range of values for the dependent variable is mapped to the arched display with uniform subdivisions. Also, on the horizontal base, values of the independent variable (commonly denoted as the X variable) are displayed. When a user positions (e.g., using the computer mouse or similar cursor-control device) the computer cursor at a particular position to indicate an independent variable value, the corresponding dependent variable value is highlighted with a needle rotating to the precise angle on the arched faced of the speedometer dial chart. If it is determined that the user has removed the cursor from an independent variable area, the needle returns to the starting point (horizontal position in a semi-circular shaped dial), which is analogous to the speedometer needle position when a vehicle is at a stand still.

The face of the speedometer dial can also display different background colors for various data ranges displayed on the chart. These colors demonstrate the relative significance of the data points. Embodiments may also have an intuitive color selection interface to change the display colors on the chart, and associate different colors for various data ranges and the corresponding area on the chart. The system can assume default color values for different data ranges displayed if the user doesn't provide specific colors associated with each data range.

There is no limit on the number of times a user may change the data values for the independent and dependent variables and redraw the chart. This feature improves user-interactivity with the system. The system can also have the added flexibility of changing the angular spread of the chart dial to any value up to 360 degrees. By default, the angular spread is 180 degrees.

Embodiments also enable the user to save the chart along with a particular set of data values, data ranges for relative differentiation and associated colors for chart display. All of this information can be saved into a database that supports the system. The supporting database may be a relational database system (from any database vendor) that complies with relational database management system or multi-dimensional database system. Such a database is not required, however, for the interface to function. The absence of such a database merely limits the ability to save user values for future retrieval. The system may still provide, however, the interactive data input and display the chart per the input data and color options provided.

The software system also has the ability to be configured such that a user with greater system control can save the data values, display ranges and color options for displaying in the charts, and other users cannot over-write changes to such values. The other users are therefore associated with a "view only" privilege and can only view the charts for which values have been provided by someone else. In this embodiment, the system includes the database functionality discussed above.

As the amount of collected data grows by leaps and bounds, the above embodiments represent a substantial improvement over conventional data visualization tools. The embodiments extend the envelope of charting capabilities, and can be a useful tool for data analysts presented with the challenge of visualizing increasing volumes of data with varying inter-relationships and increased cause-effect relationships. For example, business intelligence applications can use the embodiments to analyze sales, inventory, profits, etc. across a widely distributed organizational network. Each user can personalize the display settings and use the speedometer animation feature to more rapidly process and view data.

Those skilled in the art can now appreciate from the foregoing description that the broad techniques of the embodiments of the present invention can be implemented in a variety of forms. Therefore, while the embodiments of this invention have been described in connection with particular examples thereof, the true scope of the embodiments of the invention should not be so limited since other modifications will become apparent to the skilled practitioner upon a study of the drawings, specification, and following claims.

What is claimed is:

1. A method of facilitating data visualization visualization at a display unit of a computing device, comprising:
    plotting a plurality of independent variable values along an axis of a chart, the plurality of independent variable values corresponding to a plurality of data points;
    receiving a user-controlled position of a cursor along the axis in the chart;
    animating a dependent variable value of a particular data point as a speedometer reading in the chart if the selected area corresponds to an independent variable value of the particular data point as determined solely by the position of the cursor.

2. The method of claim 1 further including determining a needle position of the speedometer reading based on a relationship between the dependent variable value and an angular spread of the chart.

3. The method of claim 2 further including selectively modifying the angular spread based on user input.

4. The method of claim 3 further including storing the user input to a database.

5. The method of claim 1 further including determining whether the selected area corresponds to the independent variable value of the particular data point.

6. The method of claim 1 further including simultaneously animating a second dependent variable value of the particular data point as a second speedometer reading in the chart.

7. The method of claim 1 further including animating a speedometer reading of zero if the selected area does not correspond to any of the plurality of independent variable values plotted along the axis.

8. The method of claim 1 further including highlighting the dependent variable of the particular data point.

9. The method of claim 1 further including generating a multi-colored chart background that reflects a plurality of dependent variable ranges.

10. The method of claim 9 further including:
    defining the ranges based on user input;
    defining color parameters of the background based on user input; and
    generating a background legend for the chart based on the user input.

11. The method of claim 10 further including storing the user input to a database.

12. The method of claim 1 further including receiving the user selection over a network connection.

13. The method of claim 1 further including:
    receiving the plurality of data points over a network connection; and
    storing the data points to a database.

14. A method of facilitating data visualization, comprising:
    receiving a plurality of data points over a network connection;
    storing the data points to a database;
    plotting a plurality of independent variable values along an axis of a chart, the plurality of independent variable values corresponding to the plurality of data points;
    receiving a user-controlled position of a cursor along the axis in the chart, the user selection corresponding to the user positioning a cursor within a predefined distance proximate to the selected area;
    determining whether the selected area corresponds to one of the independent variable values; and
    animating a dependent variable value of a particular data point as a speedometer reading in the chart if the selected area corresponds to an independent variable value of the particular data point as determined solely by the position of the cursor.

15. The method of claim 14 further including determining a needle position of the speedometer reading based on a relationship between the dependent variable value and an angular spread of the chart.

16. The method of claim 15 further including selectively modifying the angular spread based on user input.

17. The method of claim 16 further including storing the user input to a database.

18. The method of claim 14 further including simultaneously animating a second dependent variable value of the particular data point as a second speedometer reading in the chart.

19. The method of claim 14 further including animating a speedometer reading of zero if the selected area does not correspond to any of the plurality of independent variable values plotted along the axis.

20. A machine readable storage medium comprising a set of instructions capable of being executed to:
    plot a plurality of independent variable values along an axis of a chart, the plurality of independent variable values corresponding to a plurality of data points;
    receive a user-controlled position of a cursor along the axis in the chart; and
    animate a dependent variable value of a particular data point as a speedometer reading in the chart if the selected area corresponds to an independent variable value of the particular data point as determined solely by the position of the cursor.

21. The medium of claim 20 wherein the instructions are further capable of being executed to determine a needle position of the speedometer reading based on a relationship between the dependent variable value and an angular spread of the chart.

22. The medium of claim 20 wherein the instructions are further capable of being executed to determine whether the selected area corresponds to the independent variable value of the particular data point.

23. The medium of claim 20 wherein the instructions are further capable of being executed to simultaneously animate a second dependent variable value of the particular data point as a second speedometer reading in the chart.

24. The medium of claim 20 wherein the instructions are further capable of being executed to animate a speedometer reading of zero if the selected area does not correspond to any of the plurality of independent variable values plotted along the axis.

25. A system comprising:

a processor; and a machine readable storage medium operatively coupled to the processor, the storage medium including a set of instructions capable of being executed by the processor to:

plot a plurality of independent variable values along an axis of a chart, the plurality of independent variable values corresponding to a plurality of data points, receive a user-controlled position of a cursor along the axis in the chart, and animate a dependent variable value of a particular data point as a speedometer reading in the chart if the selected area corresponds to an independent variable value of the particular data point as determined solely by the position of the cursor.

26. The system of claim 25 wherein the medium further includes instructions that are capable of being executed to determine a needle position of the speedometer reading based on a relationship between the dependent variable value and an angular spread of the chart.

27. The system of claim 26 wherein the medium further includes instructions that are capable of being executed to determine whether the selected area corresponds to the independent variable value of the particular data point.

28. The system of claim 26 wherein the medium further includes instructions that are capable of being executed to simultaneously animate a second dependent variable value of the particular data point as a second speedometer reading in the chart.

29. The system of claim 26 wherein the medium further includes instructions that are capable of being executed to animate a speedometer reading of zero if the selected area does not correspond to any of the plurality of independent variable values plotted along the axis.

* * * * *